(12) United States Patent
Okuno et al.

(10) Patent No.: US 7,292,240 B2
(45) Date of Patent: Nov. 6, 2007

(54) VIRTUAL REALITY PRESENTATION DEVICE AND INFORMATION PROCESSING METHOD

(75) Inventors: Yasuhiro Okuno, Setagaya-ku (JP); Taichi Matsui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 11/217,511

(22) Filed: Sep. 1, 2005

(65) Prior Publication Data
US 2006/0050069 A1    Mar. 9, 2006

(30) Foreign Application Priority Data
Sep. 7, 2004    (JP) .............................. 2004-259627

(51) Int. Cl.
*G06T 15/00* (2006.01)
(52) U.S. Cl. ..................... 345/419; 345/427; 345/629; 345/631

(58) Field of Classification Search ................ 345/419, 345/8, 427, 629, 631
See application file for complete search history.

(56) References Cited

U.S. PATENT DOCUMENTS 6,346,938 B1    2/2002    Chan
6,522,312 B2    2/2003    Ohshima

*Primary Examiner*—Kimbinh T Nguyen

(57) ABSTRACT

An actual-size observation mode in which an observer performs observation by being immersed in a virtual three-dimensional space in an actual size and a reduced-size observation mode in which the observer performs observation by reducing a virtual three-dimensional space computer graphics image are provided. A virtual reality presentation device includes an observation mode setting unit for setting, as an observation mode, the actual-size observation mode or the reduced-size observation mode; a position and orientation information acquisition unit for acquiring position and orientation information of the observer; and a generation unit for generating a computer graphics image from computer graphics data representing the virtual three-dimensional space in accordance with the set observation mode and the position and orientation information.

12 Claims, 4 Drawing Sheets

VIRTUAL REALITY PRESENTATION DEVICE AND INFORMATION PROCESSING METHOD

BACKGROUND OF THE INVENTION

1. Field of the Invention

The present invention relates to virtual reality presentation devices for providing experience of virtual three-dimensional (3D) spaces and to information processing methods.

2. Description of the Related Art

Virtual reality (VR) presentation devices have been available. A virtual reality presentation device includes, for example, an image display, such as a head mounted display (HMD), position and orientation detection means, such as a position and orientation sensor, for detecting the position and orientation of a viewpoint of an observer, and computer graphics (CG) image generation means.

For example, a magnetic position and orientation sensor is used as the position and orientation detection means. The magnetic position and orientation sensor is installed in the HMD worn by the observer so that the position and orientation of the head of the observer are detected. Magnetic position and orientation sensors detect the relative position and orientation between a magnetic source (transmitter) and a magnetic sensor (receiver). For example, FASTRAK®, which is a product of Polhemus, is available as a magnetic position and orientation sensor. FASTRAK® is a device for detecting a three-dimensional position (X, Y, and Z) and an orientation (pitch, yaw, and roll) within a predetermined range in real time.

The CG image generation means places a 3D modeled CG image in a virtual space having the same scale as the real space, and renders the virtual space from the position and orientation of the viewpoint of the observer detected by the position and orientation detection means.

Displaying the CG image generated as described above on the image display, such as the HMD, allows the observer to feel as if he or she is immersed in the virtual CG space.

In the above-mentioned system, in order to move a position within a virtual space, an observer actually must move the position. The position of equipment must be moved, and a real space having the same size as the virtual space is required. Thus, position movement instruction means for separately instructing position movement has been provided. For example, a direction is designated using the position and orientation sensor and position movement in that direction is instructed by pressing a button separately provided, or position movement is instructed using a device, such as a joystick. Moving a position freely within a virtual 3D space and performing observation is called "walk-through". In this case, a rendering viewpoint of a CG image changes depending on the position and orientation of the viewpoint of the observer. Thus, if the position and orientation of the viewpoint changes in a moved position, a virtual space can be observed from that viewpoint.

In addition, in recent years, technologies for presenting to users information that does not exist in the real world by combining 3D CG images and images in the real world have been developed. Such technologies are called augmented reality (AR) systems or mixed reality (MR) systems described, for example, in U.S. Pat. No. 6,522,312.

MR systems are capable of superimposing 3D CG images on real objects. U.S. Pat. No. 6,522,312 proposes a system allowing users to freely control a virtual object by superimposing the virtual object on a real object.

In known systems, when an observer is immersed in a virtual 3D space and keeps moving an observing position within the virtual 3D space, it is difficult for the observer to know a position at which the observer is located in the virtual 3D space.

SUMMARY OF THE INVENTION

The present invention solves the above-mentioned problems.

According to an aspect of the present invention, a virtual reality presentation device capable of displaying a virtual object in a virtual three-dimensional space and enabling an observer to be immersed in the virtual three-dimensional space and to perform observation, the virtual reality presentation device includes an observation mode setting unit configured to set, as an observation mode, an actual-size observation mode in which the observer performs observation by being immersed in the virtual three-dimensional space in an actual size or a reduced-size observation mode in which the observer performs observation by reducing the size of a virtual three-dimensional space computer graphics image; a position and orientation information acquisition unit configured to acquire position and orientation information of the observer; and a generation unit configured to generate a computer graphics image from computer graphics data representing the virtual three-dimensional space in accordance with the observation mode set by the observation mode setting unit and the position and orientation information of the observer acquired by the position and orientation acquisition unit.

According to another aspect of the present invention, an information processing method includes a setting step of setting an observation mode of a virtual three-dimensional space; a position and orientation information acquisition step of acquiring position and orientation information of an observer; and a generation step of generating a computer graphics image from computer graphics data representing the virtual three-dimensional space in accordance with the observation mode set in the setting step and the position and orientation information of the observer acquired in the position and orientation information acquisition step. The observation mode is an actual-size observation mode in which the observer performs observation by being immersed in the virtual three-dimensional space in an actual size or a reduced-size observation mode in which the observer performs observation by reducing the size of the virtual three-dimensional space.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will now be described in detail in accordance with the accompanying drawings.

Figure 1:
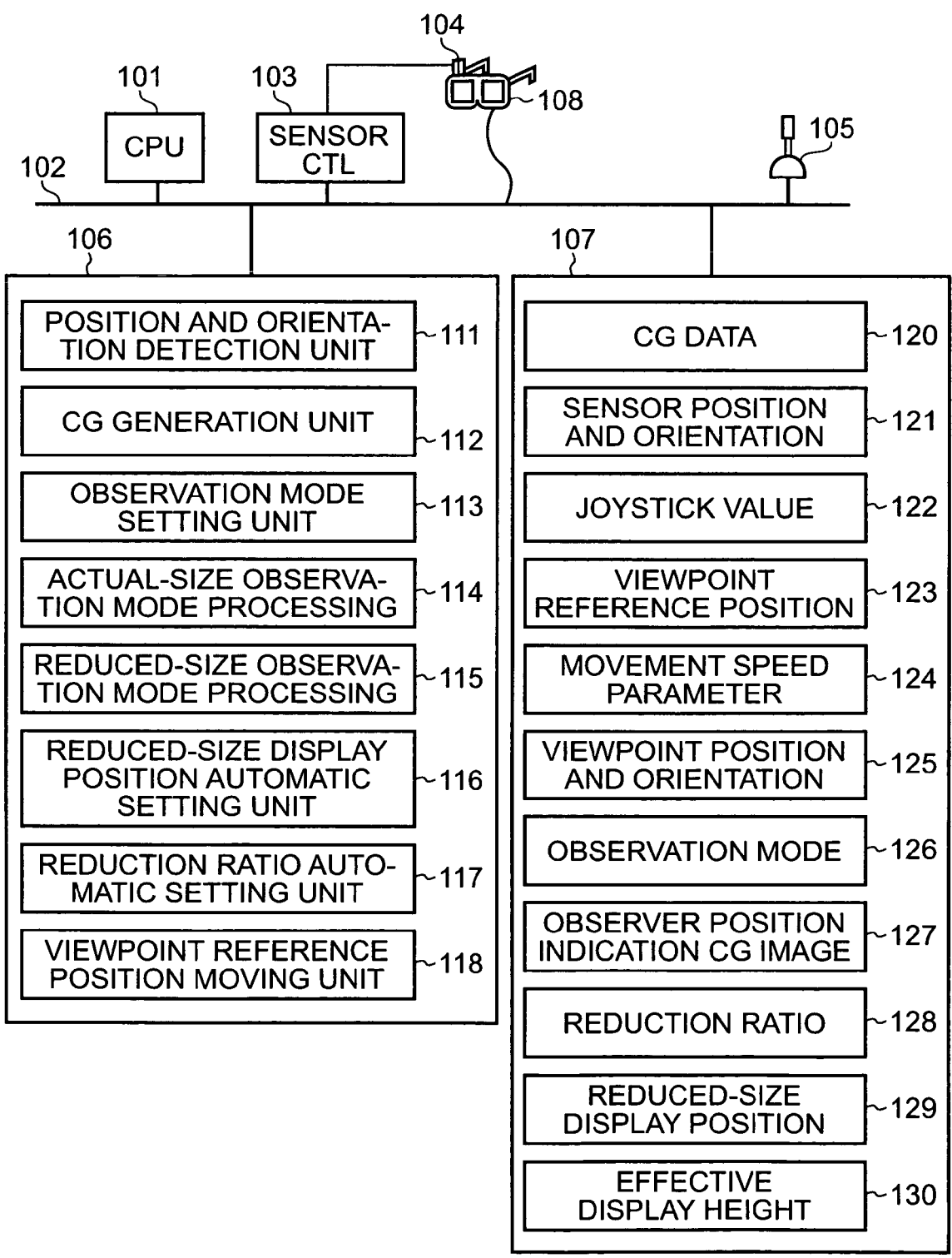
FIG. 1 shows the system structure according to an embodiment of the present invention.

FIG. 1 is a diagram illustrating an exemplary embodiment of the present invention. A position and orientation sensor controller 103, a position and orientation sensor 104, a joystick 105, memories 106 and 107, and an HMD 108 are connected to a central processing unit (CPU) 101 via a bus 102. The joystick 105 is a control lever and acquires a value corresponding to the direction of inclination of the stick. A device, such as a keyboard or an input device for video games may be substituted for the joystick 105. The memory 106 may be the same as the memory 107. The position and orientation sensor 104 is connected to the position and orientation sensor controller 103. The position and orientation sensor controller 103 is an interface for providing the position and orientation of the position and orientation sensor 104. The position and orientation sensor 104 is installed in the HMD 108 and detects the position and orientation of the HMD 108. Two or more sets of HMDs and position and orientation sensors may be used for two or more observers who experience virtual reality. 3D modeled CG data 120 to be rendered within a virtual 3D space is recorded in the memory 107 in advance.

Observation mode setting unit 113 contained in the memory 106 will now be described.

The observation mode setting unit 113 sets a value of an observation mode 126 recorded in the memory 107. In this embodiment, the observation mode 126 is set to an actual-size observation mode or a reduced-size observation mode. In exemplary embodiments, each mode is identified by recording an integer representing the corresponding mode. In this example, "0" is recorded for the actual-size observation mode and "1" is recorded for the reduced-size observation mode.

In addition to the above-mentioned processing, the observation mode setting unit 113 sets a movement speed parameter 124 so as to correspond to a set observation mode. The movement speed parameter 124 will be described below.

The observation mode setting unit 113 can be freely operated by pressing a button or the like even when an observer is experiencing virtual reality. As described below, since a virtual reality presentation device according to this embodiment determines an observation mode every time a frame is displayed, even when the observer is experiencing virtual reality, if the observation mode changes by the observation mode setting unit 113, display immediately reflects the change.

The overall flow of a process according to this embodiment is described next with reference to a flowchart shown in FIG. 2. A viewpoint reference position 123 is initialized in advance at a position at which the observer starts experiencing virtual reality in a virtual 3D space.

In step S201, position and orientation detection unit 111 acquires the position and orientation of the position and orientation sensor 104 installed in the HMD 108, detects the position and orientation of a viewpoint of the observer in accordance with the acquired position and orientation, and records the position and orientation of the viewpoint of the observer as sensor position and orientation 121. The position and orientation detection unit 111 acquires the position and orientation of the position and orientation sensor 104 via the position and orientation sensor controller 103, which is a known technology. The position and orientation sensor 104 calculates the position and orientation from a predetermined reference point. A specified position on a floor is set as a reference point in advance, and the position and orientation from the reference point are calculated. The observer is not necessarily located at the reference position, and the observer may move to other positions.

In step S202, the value of the joystick 105 is acquired, and the acquired value is recorded as a joystick value 122 in the memory 107. Values in the back and forth direction, in the left and right direction, and in the upward and downward direction are recorded as the joystick value 122.

In step S203, viewpoint reference position moving unit 118 updates the viewpoint reference position 123 (the origin of the observer). The viewpoint reference position moving unit 118 adds a value obtained by multiplying the joystick value 122 by the movement speed parameter 124 to the viewpoint reference position 123. Since the joystick value 122 includes values in the back and forth direction, in the left and right direction, and in the upward and downward direction, the values corresponding to the respective directions are added to the viewpoint reference position 123. The viewpoint reference position 123 represents a position at which the observer is located in the virtual 3D space, and serves as a reference point used for calculating the viewpoint of the observer. The joystick value 122 is multiplied by the movement speed parameter 124 in order to adjust the degree of reflection of the value obtained by the joystick 105 in the viewpoint reference position 123. The amount of movement by an operation using the joystick 105 increases in accordance with an increase in the value of the movement speed parameter 124. It is convenient in the reduced-size observation mode to set a value larger than the actual-size observation mode since wide area movement is likely to be performed in the reduced-size observation mode. Although the movement speed parameter 124 is set by the observation mode setting unit 113 in this embodiment, the movement speed parameter 124 may be determined in advance. Alternatively, the movement speed parameter 124 may be freely changed by any input method during observation.

In step S204, the value of the observation mode 126 recorded in the memory 107 is determined. The observation mode 126 is set by the observation mode setting unit 113. If the observation mode 126 is set to "0", that is, the actual-size observation mode, the process proceeds to actual-size observation mode processing 114 in step S205. If the observation mode 126 is set to "1", that is, the reduced-size observation mode, the process proceeds to reduced-size observation mode processing 115 in step S206. The actual-size observation mode processing 114 and the reduced-size observation mode processing 115 will be described below. In the actual-size observation mode processing 114 and the reduced-size observation mode processing 115, the position and size of the CG data 120 are determined, and viewpoint position and orientation 125 recorded in the memory 107 are determined. The viewpoint position and orientation 125 represent the position and orientation for starting CG rendering.

In step S207, CG generation unit 112 renders the CG data 120 as seen from the viewpoint position and orientation 125. This processing can be realized in accordance with a known general procedure for CG generation.

In step S208, the CG image rendered in step S207 is displayed on an image display unit of the HMD 108.

A virtual reality image for a screen can be displayed as described above. Repeating the entire processing sequentially and continuously enables presentation of a virtual reality image as a moving image. If the HMD 108 is capable of stereo display, a CG image from the point of view of the left eye and a CG image from the point of view of the right eye are generated in step S207, and the CG images are displayed on display units for the respective eyes of the HMD 108 in step S208. The positions of the points of views of the left and right eyes can be calculated in accordance with the position and orientation acquired by the position and orientation sensor 104.

Figure 6:
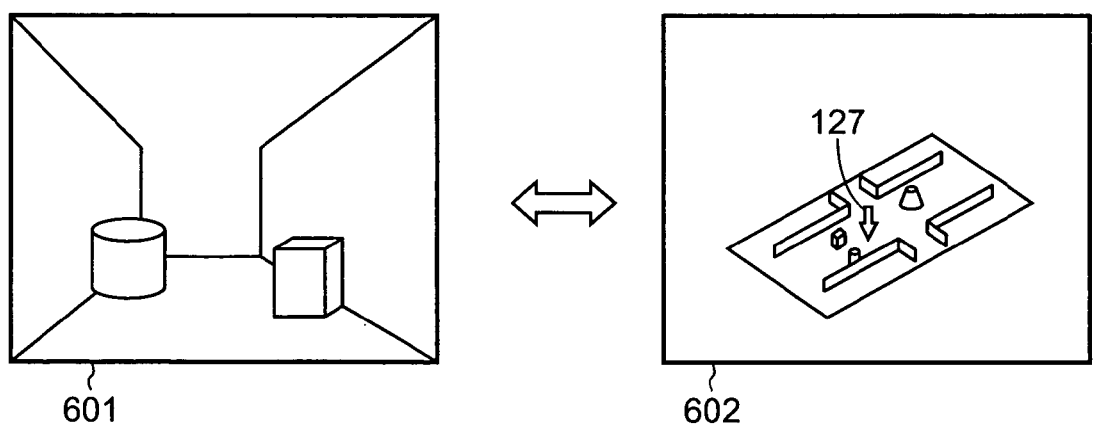
FIG. 6 shows a display example of an actual-size observation mode image and a reduced-size observation mode image.

By the actual-size observation mode processing 114, the observer is able to walk through in a virtual 3D space defined by CG data and to experience the virtual 3D space. In the actual-size observation mode processing 114, a CG image is generated in accordance with a position and an orientation obtained by adding the viewpoint reference position 123 set in accordance with the joystick 105 to the sensor position and orientation 121, and an actual-size observation mode image 601 shown in FIG. 6 is displayed.

The actual-size observation mode processing 114 in step S205 in FIG. 2 will now be described. FIG. 3 is a flowchart of the actual-size observation mode processing 114.

In step S301, a result obtained by adding the position and orientation of the viewpoint reference position 123 to the sensor position and orientation 121 is recorded as the viewpoint position and orientation 125.

Then, in step S302, the CG data 120 is placed at the origin (or a fixed position determined in advance) of the virtual space in actual size. If the size of the CG data 120 is reduced by the reduced-size observation mode processing 115 before this processing, the CG data 120 is returned to the actual size. If an observer position indication CG image 127 is added to the CG data 120, the observer position indication CG image 127 is removed.

By the reduced-size observation mode processing 115, the observer is able to check an observing position and the full view of a virtual 3D space from a point of view looking down upon the virtual 3D space. In the reduced-size observation mode processing 115, a reduced-size image of the virtual 3D space is generated using a position (a reduced-size display position 129) having a predetermined positional relationship with respect to the sensor position and orientation 121 when the actual-size observation mode processing 114 is changed to the reduced-size observation mode processing 115, and a reduced-size observation mode image 602 shown in FIG. 6 is displayed.

Figure 2:
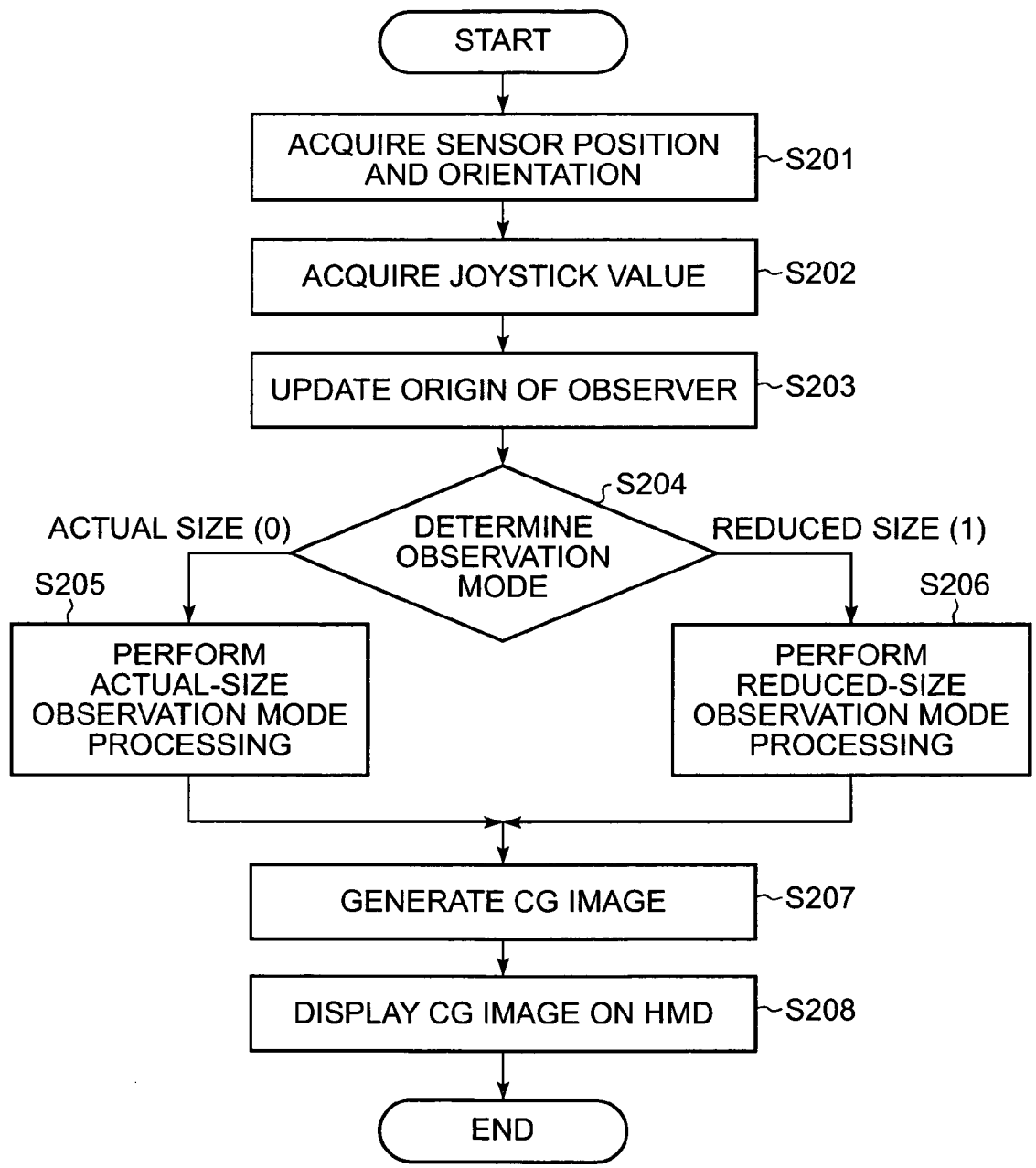
FIG. 2 is flowchart according to the embodiment.
Figure 3:
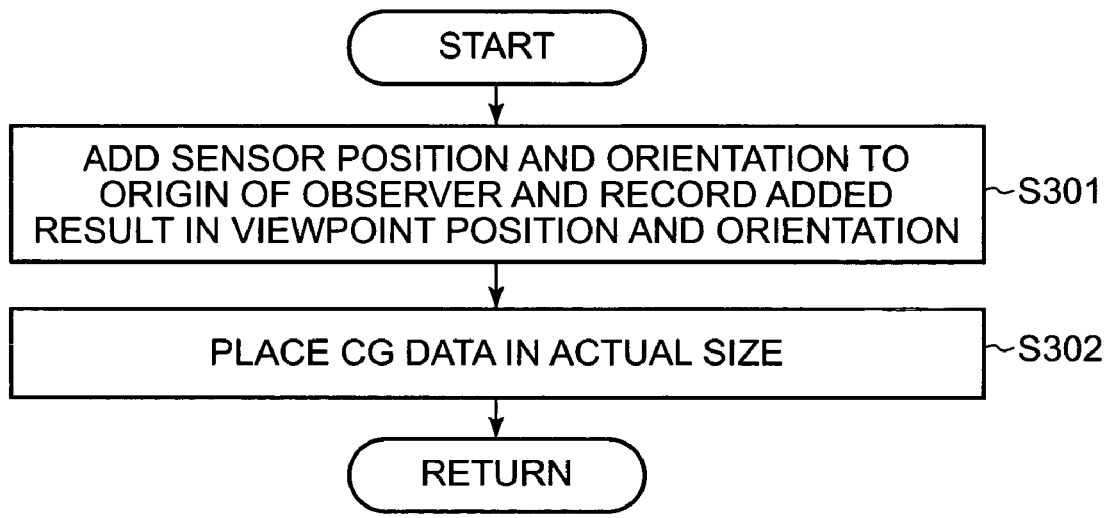
FIG. 3 is a flowchart of actual-size observation mode processing.
Figure 4:
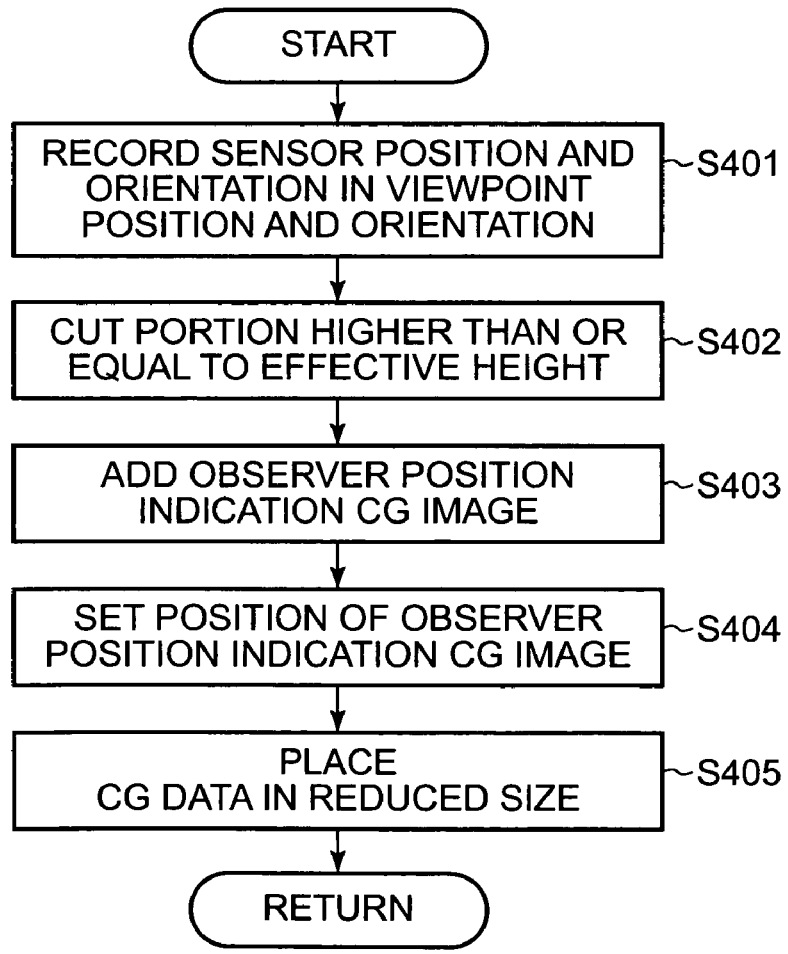
FIG. 4 is a flowchart of reduced-size observation mode processing.

The reduced-size observation mode processing 115 in step S206 in FIG. 2 is described next. FIG. 4 is a flowchart of the reduced-size observation mode processing 115.

In step S401, the sensor position and orientation 121 are recorded as the viewpoint position and orientation 125.

In step S402, an effective display height 130 is calculated from a height component of the viewpoint reference position 123, and the CG data 120 is controlled such that a portion of the CG data higher than or equal to the effective display height 130 is not displayed or is displayed translucently. This processing is performed in order to solve a problem in which, if a virtual 3D space includes a building or the like with a plurality of floors, only the appearance of the building can be observed in the reduced-size display mode. The effective display height 130 is calculated by determining a floor where the viewpoint reference position 123 exists and by referring to data prepared in advance indicating the height of the ceiling from the floor. This processing may be omitted in a case where a viewpoint is not immersed in a closed virtual space.

In step S403, the observer position indication CG image 127 is added to the CG data 120. The observer position indication CG image 127 indicates a position at which the observer is located in the actual-size observation mode in the virtual 3D space using an arrow-shaped CG image. The observer position indication CG image 127 may be displayed by reading CG data prepared in advance. Alternatively, the observer position indication CG image 127 may be generated at that time in a program memory. Since the observer position indication CG image 127 is recorded in the coordinate system of the CG data 120, if the position of the CG data 120 changes or the size of the CG data 120 reduces, the position of the observer position indication CG image 127 changes or the size of the observer position indication CG image 127 reduces.

In step S404, the viewpoint reference position 123 is set as the position of the generated observer position indication CG image 127. Since the viewpoint reference position 123 is a reference point of the position of the viewpoint of the observer in the actual-size observation mode, a position at which the observer is located when the observation mode is changed from the reduced-size observation mode to the actual-size observation mode by the observation mode setting unit 113 is equal to a position at which the observer position indication CG image 127 is displayed. Although the observer position indication CG image 127 is displayed at the viewpoint reference position 123 in this embodiment, the observer position indication CG image 127 may be displayed at a position obtained by adding the sensor position and orientation 121 to the viewpoint reference position 123. In this case, a position corresponding to the head of the observer is displayed in the reduced-size virtual 3D space CG image.

In step S405, the size of the CG data 120 (including the observer position indication CG image 127) is reduced at a reduction ratio 128, and the position of the origin of the CG data 120 is moved to a position indicated by the reduced-size display position 129. Moving the position of the origin of CG data and reducing the size of the CG data can be performed using a known technology. The reduction ratio 128 and the reduced-size display position 129 may be set in advance or may be changed at any time by receiving an input. In addition, reduced-size display position automatic setting unit 116 and reduction ratio automatic setting unit 117 are provided so that reduced-size CG data can always appear in an easily viewable position.

Figure 5:
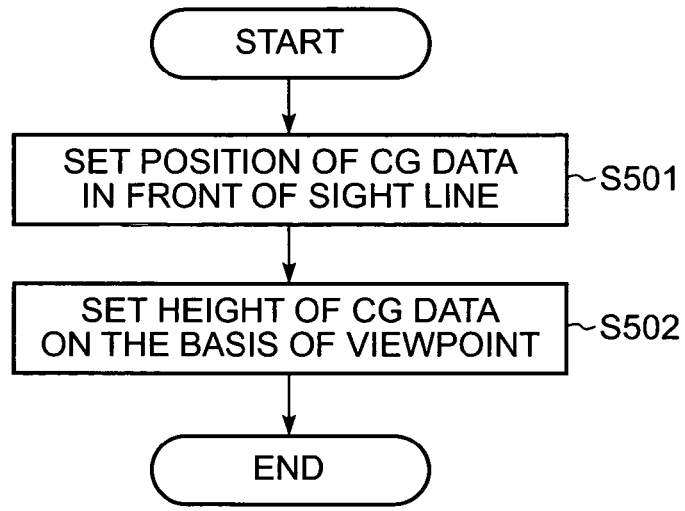
FIG. 5 is a flowchart of a process performed by a reduced-size display position automatic setting unit.

The reduced-size display position automatic setting unit 116 is described next. FIG. 5 is a flowchart illustrating an example of a process performed by the reduced-size display position automatic setting unit 116.

When the observation mode is changed from the actual-size observation mode to the reduced-size observation mode, the reduced-size display position automatic setting unit 116 operates immediately after the viewpoint position and orientation 125 are updated in step S401 of the reduced-size observation mode processing 115. In other words, an operation of the reduced-size display position automatic setting unit 116 is performed when the reduced-size observation mode processing 115 is set.

In step S501, the reduced-size display position 129 is set such that the reduced-size CG data is displayed in front of the viewpoint position and orientation 125. A position having a predetermined positional relationship with respect to the viewpoint position and orientation 125, that is, a position in front of the viewpoint and separated by a predetermined distance from the viewpoint, is calculated.

The viewpoint position and orientation 125 used in step S501 are equal to the sensor position and orientation 121 when the actual-size observation mode is changed to the reduced-size observation mode.

In step S502, the height component of the reduced-size display position 129 is determined on the basis of the height component of the viewpoint position and orientation 125. For example, a position lower than the height of the viewpoint by a predetermined value is determined as the height of the reduced-size display position 129.

Accordingly, an easily observable position is automatically set to the reduced-size display position 129 in accordance with the viewpoint position and orientation 125 of the observer when the observation mode is changed from the actual-size observation mode to the reduced-size observation mode.

In another example, the reduced-size display position 129 may be set such that the position of the observer position indication CG image 127 rendered in step S403 may be set to the center of the screen.

The reduction ratio automatic setting unit 117 is described next.

For example, the reduction ratio automatic setting unit 117 is capable of automatically calculating and setting the reduction ratio 128 such that the CG data 120 is always reduced to a predetermined size in accordance with the size of the CG data 120 by a known technology. In another example, the reduction ratio automatic setting unit 117 is capable of automatically calculating and setting the reduction ratio 128 so as to display the entire CG image within the screen by a known technology.

In the processing in step S207, a reduced-size image of a virtual 3D space corresponding to the viewpoint position and orientation 125 of the observer is generated using the reduced-size display position 129 and the reduction ratio 128 set by the foregoing processing. The reduced-size image of the virtual 3D space is fixed at the reduced-size display position 129. Thus, the direction and size of the reduced-size image of the virtual 3D space change in accordance with the relative relationship between the position and orientation of the observer and the reduced-size display position 129. For example, when approaching the reduced-size display position 129, the observer is able to look into the reduced-size image of the virtual 3D space.

As described above, according to this embodiment, the observer is able to easily know a position at which the observer is located in the reduced-size observation mode. In addition, the observer is able to easily move to a desired position. Thus, by changing between the actual-size observation mode and the reduced-size observation mode, the observer is able to easily walk though in a virtual 3D space.

A compound reality presentation system using a see-through HMD may also be possible. In this case, an observer is able to observe a reduced-size 3D model representing a virtual 3D space and a scene of the real space that are overlapped with each other. Thus, the observer is able to point his or her finger at the reduced-size 3D model for discussion or the like.

As many apparently widely different embodiments of the present invention can be made without departing from the spirit and scope thereof, it is to be understood that the invention is not limited to the specific embodiments thereof. The scope of the following claims is to be accorded the broadest interpretation so as to encompass all modifications, equivalent structures and functions.

This application claims the benefit of Japanese Application No. 2004-259627 filed Sep. 7, 2004, which is hereby incorporated by reference herein in its entirety.

What is claimed is:

1. A virtual reality presentation device capable of displaying a virtual object in a virtual three-dimensional space and enabling an observer to be immersed in the virtual three-dimensional space and to perform observation, the virtual reality presentation device comprising:
   an observation mode setting unit configured to set as an observation mode, an actual-size observation mode in which the observer performs observation by being immersed in the virtual three-dimensional space in an actual size or a reduced-size observation mode in which the observer performs observation by reducing the size of a virtual three-dimensional space computer graphics image;
   a position and orientation information acquisition unit configured to acquire position and orientation information of the observer; and
   a generation unit configured to generate a computer graphics image from computer graphics data representing the virtual three-dimensional space in accordance with the observation mode set by the observation mode setting unit and the position and orientation information of the observer acquired by the position and orientation acquisition unit when the observation mode is set by the observation mode setting unit.

2. The virtual reality presentation device according to claim 1, further comprising a viewpoint reference position moving unit configured to move a viewpoint reference position representing a position at which the observer is located in the virtual three-dimensional space, wherein
   an amount of movement based on a control input of the viewpoint reference position moving unit differs between the actual-size observation mode and the reduced-size observation mode.

3. The virtual reality presentation device according to claim 1, further comprising a reduced-size display position automatic setting unit configured to set a position at which a reduced-size virtual three-dimensional space computer graphics image is displayed in the reduced-size observation mode in accordance with a position and an orientation of the head of the observer when the reduced-size observation mode is set.

4. The virtual reality presentation device according to claim 3, wherein the reduced-size display position automatic setting unit is configured to set a reduced-size display position such that a position corresponding to a viewpoint reference position in the virtual three-dimensional space computer graphics image is located at the center of a screen.

5. The virtual reality presentation device according to claim 3, wherein the reduced-size display position automatic setting unit is configured to set a reduced-size display position in front of the observer when the observation mode is changed.

6. The virtual reality presentation device according to claim 1, further comprising a reduction ratio automatic setting unit configured to automatically set a reduction ratio of a reduced-size virtual three-dimensional space computer graphics image in the reduced-size observation mode.

7. The virtual reality presentation device according to claim 6, wherein the reduction ratio automatic setting unit is configured to set the reduction ratio so that the entire virtual three-dimensional space computer graphics image is accommodated within a screen.

8. The virtual reality presentation device according to claim 1, wherein a computer graphics image representing a viewpoint reference position is added to a reduced-size virtual three-dimensional space computer graphics image in the reduced-size observation mode and the computer graphics image is displayed.

9. The virtual reality presentation device according to claim 1, further comprising a viewpoint reference position moving unit configured to move a viewpoint reference position representing a position at which the observer is located in the virtual three-dimensional space, wherein
in the reduced-size observation mode, a portion of the computer graphics image higher than or equal to an effective height determined in accordance with the viewpoint reference position is not displayed.

10. The virtual reality presentation device according to claim 1, further comprising a viewpoint reference position moving unit configured to move a viewpoint reference position representing a position at which the observer is located in the virtual three-dimensional space, wherein
in the reduced-size observation mode, a portion of the computer graphics image higher than or equal to an effective height determined in accordance with the viewpoint reference position is displayed translucently.

11. An information processing method comprising:
a setting step of setting an observation mode of a virtual three-dimensional space;
a position and orientation information acquisition step of acquiring position and orientation information of an observer; and
a generation step of generating a computer graphics image from computer graphics data representing the virtual three-dimensional space in accordance with the observation mode set in the setting step and the position and orientation information of the observer acquired in the position and orientation information acquisition step when the observation more is set in the setting step, wherein
the observation mode is an actual-size observation mode in which the observer performs observation by being immersed in the virtual three-dimensional space in an actual size or a reduced-size observation mode in which the observer performs observation by reducing the size of the virtual three-dimensional space.

12. A program for causing a computer to perform the information processing method as set forth in claim 11.

* * * * *